United States Patent Office 3,424,670
Patented Jan. 28, 1969

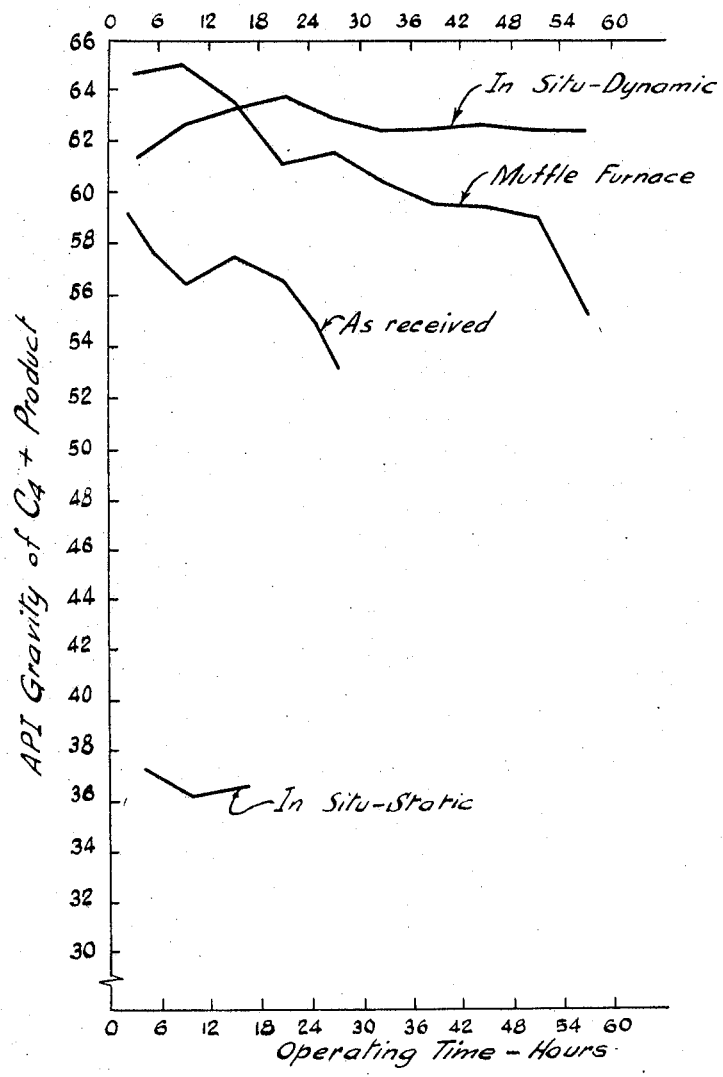

3,424,670
HYDROCRACKING CATALYST
Donald A. Messing, Poughkeepsie, and Edward T. Child and Reese A. Peck, Fishkill, N.Y., assignors to Texaco Inc., New York, N.Y., a corporation of Delaware
Filed Dec. 22, 1966, Ser. No. 603,885
U.S. Cl. 208—111     4 Claims
Int. Cl. C10g *13/04*

ABSTRACT OF THE DISCLOSURE

Improvements in both aging rate and hydrogenation activity of a hydrocracking catalyst of nickel oxide on silica-alumina are achieved by in situ calcination of fresh catalyst prior to the start of a run. The calcination is achieved by passing a flowing stream of air through the catalyst bed for several hours while maintaining the bed temperature at about 1000° F.

Background of the invention

This invention relates to the hydrocracking of hydrocarbon stocks. Specifically it relates to improvements in the operating characteristics of a particular hydrocracking catalyst, nickel oxide dispersed on a silica-alumina support.

The processing of petroleum feedstocks by hydrocracking techniques has achieved wide industrial acceptance. A variety of hydrocracking catalysts incorporating desirable features of known hydrogenating catalysts and catalytic cracking catalysts have been developed. These new catalysts are often very specific in activity and are often used for processing particular feedstocks. Some of these catalysts are found to be especially useful in maximizing the yield and/or quality of a particular product. Thus some hydrocracking catalysts will produce high yields of high octane gasoline while others maximize the yield and/or quality of jet fuels. As with other catalysts, some hydrocracking catalysts are susceptible to nitrogen poisoning and their activities are affected to a greater or lesser extent. Some catalysts, though, are not affected by the nitrogen content of the feedstock. Regardless of the trace impurities in the feed, in most instances, hydrocracking catalysts exhibit a reduction in catalytic activity with use. The measure of this decline in activity is referred to as aging rate, and is expressed as the increase in operating temperature per unit of operating time which is necessary to maintain a given conversion rate. The aging of a catalyst is usually caused by a slow coking of the catalyst sites, which eventually necessitates shutting down the hydrocracking unit for regeneration of the catalyst. It is evident that anything which extends the operating time beween catalyst regenerations is an improvement which will directly affect the economics or competitiveness of a given hydrocracking operation or hydrocracking catalyst.

Hydrocracking catalysts vary widely in composition but generally contain a cracking component, for example silica-alumina, and a hydrogenation component, such as a metal, a metal oxide or a metal sulfide. The relative activity of the cracking and hydrogenation components must be carefully balanced to achieve the desired activity. This balancing of activity will not only be dictated by the charge stock under consideration but also operating economics and product requirements. The particular catalyst selected will often determine not only the composition of the finished product but also the process conditions of temperature, pressure and space velocity.

Generally speaking, there are three types of hydrocracking catalysts insofar as their resistance to nitrogen poisoning is concerned. The first is subject to nitrogen poisoning, whether it be in the form of organic nitrogen or ammonia. When the feedstock contains sufficient nitrogen, e.g., above about 10 p.p.m., to contaminate these catalysts, the feed must be hydrogenated and then stripped of the resultant ammonia prior to introducing this hydrocarbon feed into the hydrocracker. The second group of catalysts although subject to organic nitrogen poisoning is ammonia resistant. Therefore hydrogenating the feed prior to hydrocracking is sufficient; the intermediate separation or stripping is not required. The third group of catalysts is both organic nitrogen and ammonia resistant, and requires no pretreatment of the feed before hydrocracking. All of these catalysts are usually resistant to sulfur and $H_2S$ poisoning; however, if $H_2S$ or sulfur are a problem with a particular hydrocracking catalyst, a hydrogenation treatment followed by a stripping or separation step will remove the troublesome sulfur as $H_2S$.

In summary then, hydrocracking catalysts are susceptible to aging and any operation or technique which reduces the aging rate will directly affect the economics of the hydrocracking process under study.

Summary of the invention

Our invention relates to improvements in hydrocracking by a novel treatment of a particular hydrocracking catalyst. Specifically, we have found that when employing a hydrocracking catalyst of nickel oxide on a silica-alumina base, the initial aging rate of the catalyst is appreciably improved by subjecting the bed of fresh catalyst, as received from the manufacturer, to a dynamic calcination prior to the introduction of hydrocarbon feed and hydrogen into the reactor vessel. This calcination process comprises passing air through the catalyst bed while maintaining a bed temperature of about 1000° F. for at least 2 hours. In addition to enhancing the initial aging rate of the catalyst, the hydrogenation activity is also improved.

Brief description of drawing

The drawing is a graph illustrating the change with operating time of the gravity of the product from a catalytic hydrocracker. The graph shows the effect of several preoperational treatments of the hydrocracking catalyst.

Description of the preferred embodiment

The nickel oxide on silica-alumina catalyst, which is the subject of our improvement, finds particular application in hydrocracking processes wherein it is desirable to produce a high octane gasoline from a low nitrogen feedstock boiling in the the 400 to 650° F. range. Light cycle gas oil from a catalytic cracker makes a particularly useful feedstock with this hydrocracking catalyst, producing an especially high yield of high octane gasoline.

Most hydrocracking processes employ the catalyst in a fixed bed, with the reactor being operated for extended periods of time until the aging of the catalyst has reduced its activity to an uneconomical level. At this point the flows of hydrogen and petroleum feedstocks are terminated and the bed of hydrocracking catalyst is regenerated. Depending on the particular catalyst, from 1 to 2 regenerations per year are normally required. It is usual practice when charging the reactor vessel with a fresh catalyst to load the catalyst in the condition in which it is supplied by the catalyst manufacturer. Those catalysts which are preferably used in a calcined state are normally calcined by the catalyst supplier before shipment to the petroleum processor. By "fresh" catalyst we mean catalyst which has not been contacted by the processing streams—it is "as received" from the manufacturer.

After the catalyst is charged to the reactor, it is the usual practice to commence the next hydrocracking run. Normally, the vessel is brought up to temperature in the presence of hydrogen, following which the petroleum feedstock is introduced. It was therefore surprising to us to find that the aging rate of a hydrocracking catalyst could be substantially improved by an in situ dynamic calcination of a bed of fresh hydrocracking catalyst comprising nickel oxide on silica-alumina.

After the $NiO$—$SiO_2$—$Al_2O_3$ catalyst is charged to a hydrocracking reactor, the vessel is brought up to a temperature of between 800 and 1200° F., preferably 900 to 1100° F. while continuously passing a stream of air through the catalyst bed. The air flow rate is held between 50 and 5000 std. ft.³/hr./ft.² of reactor cross section and preferably between 200 and 2000 while the reactor pressure is atmospheric to 500 p.s.i.g., preferably atmospheric to 100 p.s.i.g. The temperature is maintained for 2 to 25 hours, preferably 5 to 25 hours. Following the calcination, the bed of catalyst is cooled down under a blanket of inert gas, such as nitrogen.

The following examples are illustrative of the process of the present invention. It is to be understood that these examples are given for the purpose of illustration and are not to be considered as limiting the spirit and scope of the appended claims.

The hydrocarbon feedstock employed to illustrate the process of the improvement of the present invention was a catalytic cracker light cycle gas oil having the analysis shown in Table I below:

*Table I*

| | |
|---|---|
| Gravity, ° API | 33.3 |
| ASTM dist., ° F.: | |
|   IBP–10% | 410–484 |
|   20–30% | 498–510 |
|   40–50% | 518–530 |
|   60–70% | 546–558 |
|   80–90% | 580–600 |
|   95–EP | 612–636 |
| Sulfur, wt. percent | 0.009 |
| Nitrogen, p.p.m. | 1 |
| FIA: | |
|   Aromatics _____volume percent | 33.5 |
|   Olefins _____do | 5.5 |
|   Saturates _____do | 61.0 |

The catalyst used in the following examples was a nickel oxide hydrogenation catalyst dispersed on pellets of silica-alumina cracking catalyst. The composition of the catalyst was

| | Percent |
|---|---|
| NiO | 5 |
| $Al_2O_3$ | 12.4 |
| $SiO_2$ | 82.6 |

In all examples the catalyst was used in the condition it was received from the manufacturer.

The operating conditions employed in all these examples are set forth in Table II below.

*Table II.—Hydrocracking operating conditions*

| | |
|---|---|
| Temperature ° F. | 600 |
| Pressure p.s.i.g. | 1500 |
| Liquid hourly space velocity | 1.0 |
| Hydrogen s.c.f./bbl | 7500 |

EXAMPLE 1

Fresh $NiO$—$Al_2O_3$—$SiO_2$ catalyst, in as received condition, was loaded into a hydrocracking reactor, the system was purged with nitrogen to remove all traces of air and pressure tested with hydrogen for leaks. When found to be leak-proof, the temperature was brought up to within 50° F. of the operating temperature at which point the hydrogen flow was introduced into the reactor. When the reactor temperature was within 25° F. of the desired operating temperature the feed was introduced into the reactor. Following a one-half hour adjustment period during which time, temperature and feed rate were lined out to the desired operating conditions, the operating run began. The product from the reactor flowed to a high pressure separator where the gas stream was continuously vented therefrom. The liquid product was collected in a separator vessel maintained at 60° F. Every six hours, the product was withdrawn from the high pressure separator to a glass receiver immersed in a bath of Dry Ice and kerosene which maintained the product at about 35–40° F. to reduce losses of butanes and pentanes on subsequent handling. Routine analyses were run on the hydrocracked product.

EXAMPLE 2

A second test was run which was in all respects the same as that of Example 1 except that the fresh catalyst was heated in a muffle furnace at 1000° F. for 5 hours before being charged to the reactor. The furnace was open to the atmosphere and air passed through it by natural convection.

EXAMPLE 3

Another test was run which was in all respects the same as that of Example 1 except that after the fresh catalyst was charged to the reactor both ends of the reactor were sealed off and the catalyst was calcined in situ and statically in air at 1000° F. for 5 hours. After the reactor cooled down the run continued as in Example 1.

EXAMPLE 4

The improvement of our invention was demonstrated in yet another run which was in all respects the same as Example 1 except for an in situ dynamic calcination of the fresh hydrocracking catalyst. Following the charging of the fresh catalyst into the reactor, the catalyst was heated to 1000° F. in a stream of air and held at 1000° F. for 5 hours under atmosphere pressure while air was continuously passed through the bed of catalyst at 730 s.c.f./hr./ft.² of reactor cross-section. After the reactor was cooled, under a nitrogen atmosphere, a hydrocracking run was conducted as in Example 1.

In all four runs each charge of hydrocracking catalyst was from the same shipment and in each run fresh catalyst was used as received from the supplier. The $$NiO—Al_2O_3—SiO_2$$

catalyst had been calcined by the manufacturer prior to shipment.

To study the aging of the catalyst in these four examples, the operating temperature was held constant and the aging rate was measured as a function of the change in API gravity of the hydrocracked liquid product during the run. Table III below presents the gravity of the hydrocracked product as well as some data on the aromatic content of the product. These data are based on samples collected over six hour periods.

TABLE III

| Operating hours | API gravity of C₄⁺ hydrocracked products, example | | | | FIA, vol. percent aromatics, example | | | |
|---|---|---|---|---|---|---|---|---|
| | 1 | 2 | 3 | 4 | 1 | 2 | 3 | 4 |
| 0–6 | 58.7 | 64.7 | 37.3 | 61.4 | 7.0 | | 26.5 | 0.0 |
| 6–12 | 56.5 | 65.0 | 36.1 | 62.7 | | | | |
| 12–18 | 57.6 | 63.6 | 36.4 | 63.3 | 11.0 | 4.0 | 28.0 | 0.0 |
| 18–24 | 56.7 | 61.2 | | 63.8 | | | | |
| 24–30 | 53.6 | 61.7 | | 63.0 | 10.0 | 6.0 | | 0.5 |
| 30–36 | | 60.5 | | 62.5 | | | | |
| 36–42 | | 59.6 | | 62.6 | | 6.0 | | 0.0 |
| 42–48 | | 59.4 | | 62.7 | | | | |
| 48–54 | | 59.1 | | 62.5 | | 9.5 | | 1.0 |
| 54–60 | | 55.3 | | 62.5 | | | | |

From an examination of the above table and its graphical representation in the drawing, it is seen that the fresh $NiO$—$Al_2O_3$—$SiO_2$ catalyst even though already calcined by the manufacturer had a fairly high aging rate. Further, a furnace calcination of this catalyst prior to its being loaded in the hydrocracking reactor produced a catalyst which had an initial high activity, higher than that of the catalyst as received, but it also had a high aging rate—its aging rate was approximately equal to that of the catalyst as received. Calcining the catalyst in situ with a static blanket of air produced a catalyst of little value because its initial activity was too low to be of commercial interest. The process which is the subject of our improvement, on the other hand, calcined the catalyst dynamically and in situ to produce a catalyst which had not only an initially high activity level but also one which possessed a substantially improved aging rate.

In addition, our improvement produces a

$$NiO\text{—}Al_2O_3\text{—}SiO_2$$

hydrocracking catalyst which has exceptionally improved hydrogenation activity in that when used to hydrocrack a light cycle gas oil it yields a product with exceptionally low aromatic content.

It is evident from the above examples that the improvements described herein produce a superior hydrocracking catalyst. It is to be understood that the above description is merely illustrative of a preferred embodiment of the invention, of which many variations may be made by those skilled in the art without departing from the spirit thereof.

We claim:

1. In a process of hydrocracking petroleum stocks at elevated temperatures and pressures in the presence of hydrogen and a catalyst comprising nickel oxide on a silica-alumina support, and in which a charge of fresh catalyst is placed in the reactor vessel and prior to the introduction of hydrocarbon feed and hydrogen into the reactor vessel for the initial operation with the fresh charge, the improvement which comprises:

(a) heating the catalyst to a temperature in the range of 800 to 1200° F.,
(b) maintaining said temperature for 2 to 25 hours and the pressure at atmospheric to 500 p.s.i.g. while passing air in contact with the catalyst at a rate of 50 to 5000 std. ft.$^3$/hr./ft.$^2$ of reactor cross section, and
(c) cooling said catalyst in the presence of an inert gas.

2. An improvement according to claim 1 wherein: the temperature is no more than 1000° F. and the time is at least 2 hours.

3. An improvement according to claim 1 wherein: the temperature is 900 to 1100° F., the time is 5 to 25 hours, the pressure is atmospheric to 100 p.s.i.g. and the air rate is 200 to 2000 std. ft.$^3$/hr./ft.$^2$.

4. An improvement according to claim 3 wherein: the temperature is about 1000° F., the time is about 5 hours, the pressure is atmospheric, the air rate is 730 std. ft.$^3$/hr./ft.$^2$ and the inert gas is nitrogen.

References Cited

UNITED STATES PATENTS 3,242,067    3/1966    Arey et al. _____ 208—111

DELBERT E. GANTZ, *Primary Examiner.*

T. H. YOUNG, *Assistant Examiner.*